US 8,786,138 B2

Jul. 22, 2014

(12) United States Patent
Carter et al.

(10) Patent No.: US 8,786,138 B2
(45) Date of Patent: Jul. 22, 2014

(54) SYSTEMS, METHODS, AND APPARATUS FOR CONTROLLING ACTUATOR DRIVE CURRENT USING BI-DIRECTIONAL HYSTERESIS CONTROL

(75) Inventors: Roy Anthony Carter, Salem, VA (US);
Ravindra Mahavir Desai, Hyderabad Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 12/784,638

(22) Filed: May 21, 2010

(65) Prior Publication Data
US 2011/0285209 A1    Nov. 24, 2011

(51) Int. Cl.
*H01H 35/00* (2006.01)
*H01H 83/00* (2006.01)

(52) U.S. Cl.
USPC ........................................ 307/116

(58) Field of Classification Search
USPC ........................................ 307/116
See application file for complete search history.

(56) References Cited

U.S. PATENT DOCUMENTS

| | | | | |
|---|---|---|---|---|
| 4,377,144 | A | * | 3/1983 | Takahashi ............. 123/490 |
| 4,446,410 | A | * | 5/1984 | Yagura et al. ............ 318/687 |
| 4,897,778 | A | * | 1/1990 | Miyamoto et al. ......... 700/69 |
| 4,978,865 | A | * | 12/1990 | Hartmann et al. ......... 307/140 |
| 5,305,215 | A | | 4/1994 | Brekkestran et al. |
| 5,513,094 | A | | 4/1996 | Stanley |
| 5,514,977 | A | | 5/1996 | Agiman |
| 5,568,528 | A | | 10/1996 | Gaussa, Jr. et al. |
| 5,838,515 | A | | 11/1998 | Mortazavi et al. |
| 5,886,504 | A | | 3/1999 | Scott et al. |
| 5,900,722 | A | | 5/1999 | Scott et al. |
| 5,926,011 | A | | 7/1999 | Elliott |
| 6,018,200 | A | | 1/2000 | Anderson et al. |
| 6,118,186 | A | | 9/2000 | Scott et al. |
| 6,208,497 | B1 | | 3/2001 | Seale et al. |
| 6,442,210 | B1 | | 8/2002 | Pennell |
| 6,836,032 | B2 | | 12/2004 | Vaknin |

(Continued)

FOREIGN PATENT DOCUMENTS

CN    1136370 A    11/1996
EP    0 708 396 A1    4/1996

(Continued)

OTHER PUBLICATIONS

JP Patent 61134118 to Ichijo, english abstract, Jun. 21, 1986.*

(Continued)

*Primary Examiner* — Carlos Amaya
(74) *Attorney, Agent, or Firm* — Sutherland Asbill & Brennan LLP

(57) ABSTRACT

Certain embodiments of the invention may include systems, methods, and apparatus for controlling actuator drive current. According to an example embodiment of the invention, a method is provided for controlling actuator drive current. The method may include receiving a reference signal, determining a feedback signal based at least in part on the drive current, determining a conditioned feedback signal based at least in part on the feedback signal, comparing the reference signal to the conditioned feedback signal, and controlling the drive current based on the comparison of the reference signal and the conditioned feedback signal. Certain embodiments of the method may include manipulating one or more devices to establish at least one positive current path and at least one negative current path through an actuator via hysteresis control.

20 Claims, 12 Drawing Sheets

(56) References Cited

U.S. PATENT DOCUMENTS

| | | |
|---|---|---|
| 6,947,824 B1 | 9/2005 | Livshiz et al. |
| 6,981,381 B1 | 1/2006 | Wang et al. |
| 2002/0036487 A1* | 3/2002 | Moriconi et al. .............. 323/288 |
| 2004/0195936 A1* | 10/2004 | Chemisky et al. ............ 310/317 |
| 2004/0232868 A1 | 11/2004 | Sawtell et al. |
| 2006/0001393 A1 | 1/2006 | Rozman |
| 2006/0028751 A1 | 2/2006 | Takeuchi |
| 2006/0218933 A1 | 10/2006 | Schuermans et al. |
| 2007/0086755 A1 | 4/2007 | Dang et al. |
| 2007/0137075 A1 | 6/2007 | Dang et al. |
| 2007/0236164 A1 | 10/2007 | Xia et al. |
| 2007/0262797 A1 | 11/2007 | Okamoto et al. |
| 2008/0148726 A1 | 6/2008 | Halsey et al. |
| 2011/0288662 A1 | 11/2011 | Carter et al. |
| 2013/0106589 A1 | 5/2013 | Posamentier |

FOREIGN PATENT DOCUMENTS

| | | |
|---|---|---|
| EP | 0 883 042 A1 | 12/1998 |
| EP | 0883042 A1 | 12/1998 |
| EP | 1 780 514 A1 | 5/2007 |
| GB | 2 305 518 A | 9/1997 |
| WO | 9900815 A1 | 1/1999 |

OTHER PUBLICATIONS

Submission of Information Disclosure Statement.

Search Report issued in connection with EP Patent Application No. 11166562.6, Oct. 7, 2011.

Search Report issued in connection with EP Patent Application No. 11166563.4, Oct. 17, 2011.

U.S. Appl. No. 12/784,629, filed May 21, 2010, Roy Anthony Carter, et al.

U.S. Appl. No. 12/784,649, filed May 21, 2010, Roy Anthony Carter, et al.

Office Action for European Application No. 11166563.4-2206 mailed Jul. 2, 2012.

European Search Report for European Application No. 11166563.4-2206 mailed Jul. 31, 2012.

Office Action for Chinese Application No. 201110149044.7 mailed May 6, 2014.

Non-Final Office Action for U.S. Appl. No. 13/908,499 mailed Apr. 28, 2014.

* cited by examiner

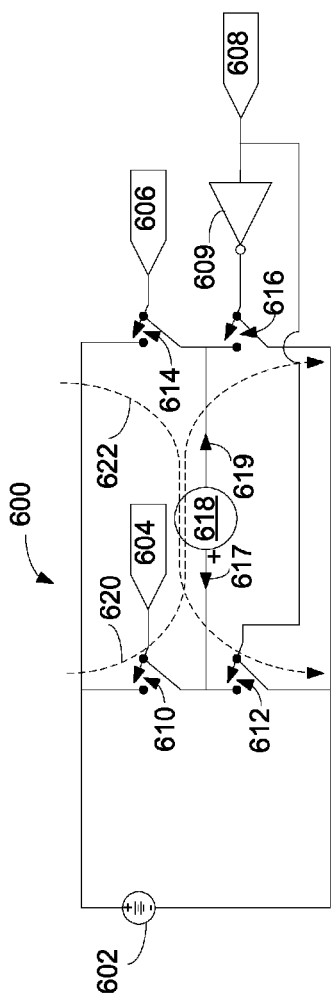
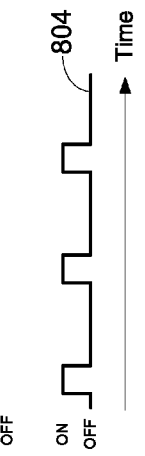
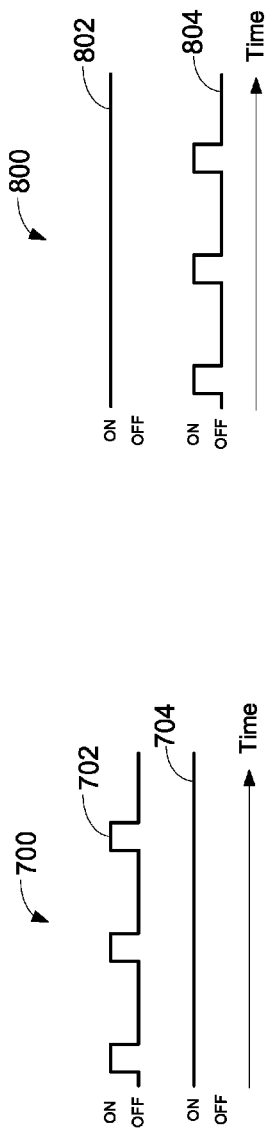
FIG. 6
FIG. 7
FIG. 8

SYSTEMS, METHODS, AND APPARATUS FOR CONTROLLING ACTUATOR DRIVE CURRENT USING BI-DIRECTIONAL HYSTERESIS CONTROL

RELATED APPLICATIONS

This application is related to application Ser. No. 12/784,629, filed concurrently with the present application on May 21, 2010, entitled: "Systems, Methods, and Apparatus for Providing High Efficiency Servo Actuator and Excitation Drivers," the contents of which are hereby incorporated by reference in their entirety.

This application is also related to application Ser. No. 12/784,649, filed concurrently with the present application on May 21, 2010, entitled: "Systems, Methods, and Apparatus for Controlling Bi-directional Servo Actuator Using an H-Bridge with Hysteresis Control," the contents of which are hereby incorporated by reference in their entirety.

This application is also related to application Ser. No. 12/784,657, filed concurrently with the present application on May 21, 2010, entitled: "Systems, Methods, and Apparatus for Controlling Bi-directional Servo Actuator with PWM Control," the contents of which are hereby incorporated by reference in their entirety.

FIELD OF THE INVENTION

This invention generally relates to servo controllers, and more specifically, to controlling actuator drive current using bi-directional hysteresis control.

BACKGROUND OF THE INVENTION

Gas and steam turbines utilize servos for controlling actuators associated with various components of the turbines. The actuators typically move fuel valves, speed ratio valves, compressor vanes, and other mechanisms to control air and fuel flow in the turbine system. To control the position of the servo actuator, a precise and controlled amount of direct current (DC) (typically up to +/−200 mA) is passed through the actuator coil, and the current may be based in part on feedback from a transducer coupled to the mechanism or the actuator. Conventional servo controllers may provide the drive current for the actuators using linear buffers or linear amplifiers, which typically require bulky heat sinks to dissipate excess heat produced from the drive electronics.

In many turbines, the various valves and vanes may be controlled using hydraulic actuators. The position of the hydraulic actuators, valves, or vanes may be monitored and fed-back to the controller using transducers such as resolvers, linear variable differential transformers (LVDTs) or linear variable differential reluctance (LVDR) devices. Such devices are highly reliable in the harsh turbine environments, but they usually require alternating current (AC) excitation for proper operation. The AC excitation current is typically provided by an excitation drive circuit with a linear output amplifier, which also can require a bulky heat sink to dissipate the excess heat produced by the drive electronics.

When a turbine has a large number of valves, each with associated actuators and LVDTs, the turbine's servo controller may become excessively bulky due to the required number and size of heat sinks for the drive circuitry. Furthermore, when drive energy is converted to heat through the linear drive circuitry, the energy efficiency of the circuit is reduced, and the dissipated heat adds to the overall temperature of the control panel.

BRIEF SUMMARY OF THE INVENTION

Some or all of the above needs may be addressed by certain embodiments of the invention. Certain embodiments of the invention may include systems, methods, and apparatus for controlling actuator drive current using bi-directional hysteresis control.

According to an example embodiment of the invention, a method is provided for controlling actuator drive current. The method may include receiving a reference signal, determining a feedback signal based at least in part on the drive current, determining a conditioned feedback signal based at least in part on the feedback signal, comparing the reference signal to the conditioned feedback signal, and controlling the drive current based on the comparison of the reference signal and the conditioned feedback signal.

According to another example embodiment, a method is provided for controlling actuator drive current. The method may include receiving a reference signal, determining a feedback signal based at least on current associated with the actuator, controlling the drive current based on the comparison of the reference signal and a conditioned feedback signal, and manipulating one or more devices to establish at least one positive current path and at least one negative current path through an actuator via hysteresis control.

According to another example embodiment, a system is provided for controlling drive current. The system may include an actuator and a current control device in communication with the actuator configured to provide drive current to the actuator. The system may also include a circuit in communication with the actuator and the current control device. The circuit may be configured to receive a reference signal, determine a feedback signal based at least in part on the drive current, determine a conditioned feedback signal based at least in part on the feedback signal, compare the reference signal to the conditioned feedback signal, and manipulate the current control device based on the comparison of the reference signal and the conditioned feedback signal.

According to another example embodiment, an apparatus is provided for controlling actuator drive current. The apparatus may include a current control device in communication with the actuator and configured to provide drive current to the actuator. The apparatus may also include a circuit in communication with the actuator and the current control device. The circuit may be configured to receive a reference signal, determine a feedback signal based at least in part on the drive current, determine a conditioned feedback signal based at least in part on the feedback signal, compare the reference signal to the conditioned feedback signal, and manipulate the current control device based on the comparison of the reference signal and the conditioned feedback signal.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein:

FIG. 6 is a circuit diagram of an illustrative H-bridge, according to an example embodiment of the invention.

FIG. 7 is a chart of positive current switch states, according to an example embodiment of the invention.

FIG. 8 is a chart of negative current switch states, according to an example embodiment of the invention.

DETAILED DESCRIPTION OF THE INVENTION

Figure 1:
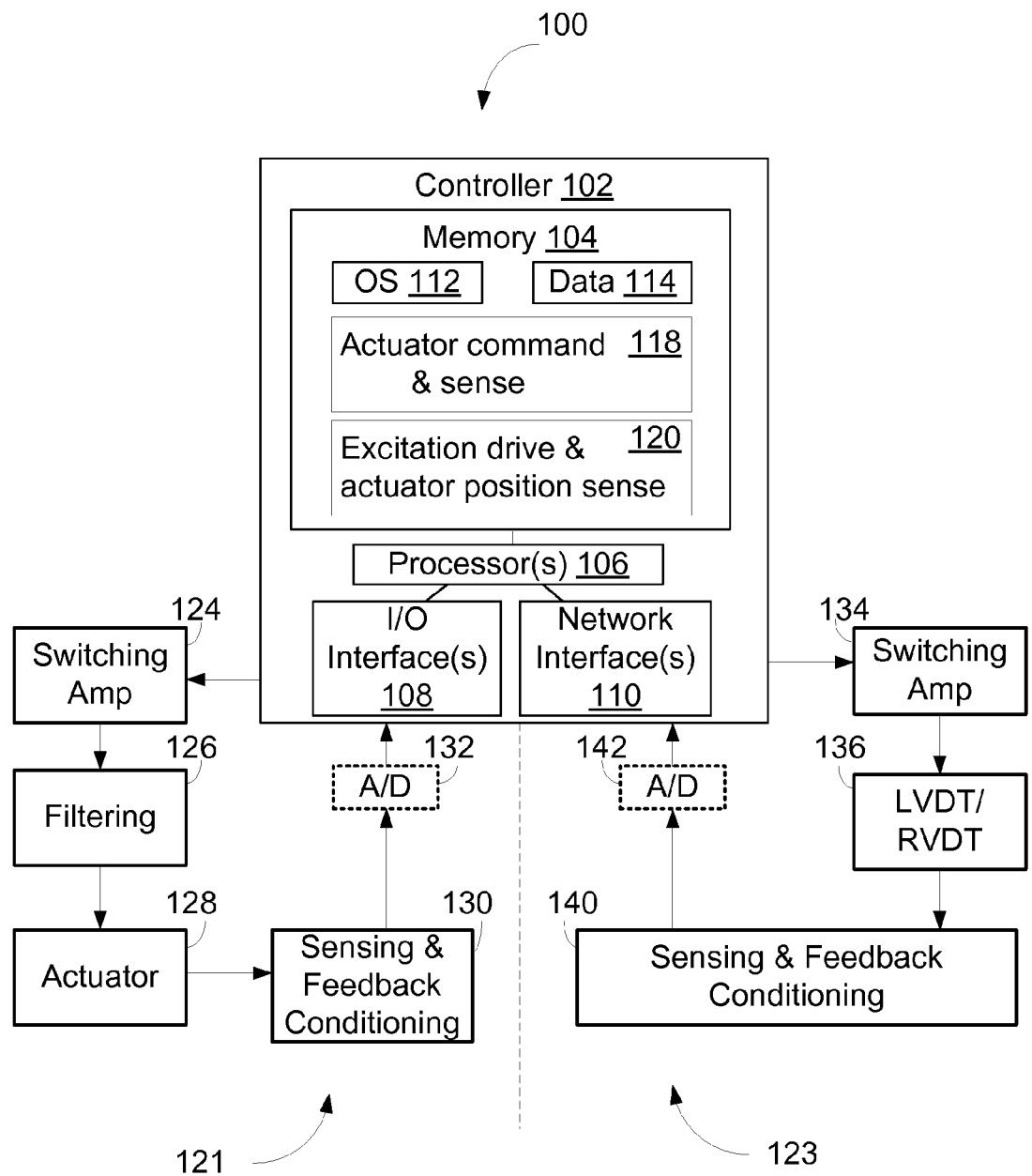
FIG. 1 is a block diagram of an illustrative controller system according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable complete or partial elimination of heat sinks by replacing the linear output devices with switching amplifiers. According to example embodiments of the invention, switching devices may be provided for driving actuators associated with a turbine. In certain example embodiments, switching devices may be provided for driving excitation signals for position sensors associated with actuators. According to example embodiments, improved efficiency and reduced heat dissipation may be realized in switched actuator or excitation drives, since the driver circuitry can either be in an "on" or an "off" state instead of in a state of semi-conduction. The reduction in heat dissipation may eliminate or enable the reduction in the size of heat sinks as compared to those in linear amplifier drivers.

According to certain example embodiments of the invention, a switching output amplifier is provided for use as a servo actuator. In certain embodiments of the invention, the switching output amplifier may provide average current up to, and above, 200 mA for controlling a servo actuator. In certain embodiments of the invention, the actuator current may be reversed to reverse the direction of the actuator.

According to certain example embodiments of the invention, a switching output amplifier is provided for use as a position sensor excitation driver. In certain embodiments, multiple position sensors may be driven from a common excitation driver. In certain embodiments, more than 12 sensors can be accommodated using a single switched excitation driver.

According to certain example embodiments, position sensors may include resolvers, linear variable differential transformers (LVDTs), or linear variable differential reluctance (LVDR) devices. In other example embodiments, the position sensors may include rotary variable differential transformers (RVDTs) or rotary variable differential reluctance (RVDR) devices. Such devices have proven to be reliable, even in the harsh environmental conditions associated with gas and steam turbines, primarily due to electromagnetic coupling from an excitation coil to one or more sensing coils via a moveable core that may be coupled (directly or indirectly) to the actuator. It should be understood that the term LVDT may be defined to refer to any similar position detector, linear or rotary.

In accordance with example embodiments of the invention, switching amplifiers may be used to drive servo actuators and position sensor excitation coils. Accordingly, the use of the switching amplifiers may eliminate associated heat sinks, reduce costs, reduce the amount of heat dissipated in the circuit and in the panel, and reduce the space occupied both in the panel and on the printed circuit board.

In accordance with certain embodiments of the invention, one or more actuators may be controlled by generating a reference signal. Based on this reference signal, a switched signal may be generated for manipulating the actuator. In certain example embodiments, generating the reference signal may comprise generating a pulse width modulation (PWM) signal. In certain embodiments, at least a part of the switched signal coupled to the actuator may be sensed and utilized as feedback for further controlling the reference signal or the switched signal.

In certain embodiments, the position of the actuator, valve, or vane position may be determined by generating a switched excitation signal and applying the excitation signal to the excitation winding of an LVDT or similar device attached or coupled to the actuator. The excitation winding may couple the switched excitation signal to a secondary (or sensing) winding on the LVDT device with the coupling strength proportional to the position of the actuator, valve, or vane position. The coupled switched excitation signal may be utilized as a second feedback for position control of the actuator via a servo. According to example embodiments of the invention, the reference signal may be controlled based at least in part on the second feedback associated with the switched excitation signal.

In accordance with example embodiments of the invention, manipulating the actuator with a switched drive signal may further be based on a polarity signal. In example embodiments, generating a switched excitation signal may include generating a pulse width modulation signal. In example embodiments, controlling the reference signal may further be based on the second feedback associated with the switched drive signal.

Various system components for efficiently controlling and monitoring actuator, vane, or valve positions, according to example embodiments of the invention, will now be described with reference to the accompanying figures.

FIG. 1 illustrates a controller system 100, according to example embodiments of the invention. The controller system 100 may include a controller 102, at least one memory 104, and one or more processors 106. According to example embodiments, the controller 102 may also include one or more input/output (I/O) interfaces 108 and one or more network interfaces 110. The memory 104 associated with the controller 102 may include an operating system (OS) 112 and data 114. The memory 104 may also include one or more modules that are configured, programmed, or operable to carry out the processes associated with the controller 102. In certain example embodiments, the memory 104 may include an actuator command and sense module 118. In certain example embodiments, the memory 104 may include an excitation drive and actuator valve or vane position sense module 120.

According to example embodiments of the invention, FIG. 1 also illustrates actuator driving and sensing circuitry 121 and excitation drive and actuator valve or vane position sense circuitry 123. In accordance with an example embodiment of the invention, the actuator driving and sensing circuitry 121 may include a switching amplifier 124, filtering components 126, an actuator 128, and sensing and feedback conditioning circuitry 130. According to an example embodiment, an analog to digital converter 132 may also be included. The analog to digital converter may take the form of a voltage-controlled oscillator (VCO), a successive-approximation register (SAR) converter, a Delta-Sigma converter, or a flash converter. In other example embodiments, the feedback may be converted to a digital signal.

According to an example embodiment of the invention, and as shown in FIG. 1, the actuator valve or vane position sense circuitry 123 may include a switching amplifier 134, a position sensor 136, which may include an LVDT, and sensing and feedback conditioning circuitry 140. According to an example embodiment, an analog to digital converter 142 may also be included in the actuator valve or vane position sense circuitry 123. The analog to digital converter 142 may take the form of a voltage-controlled oscillator (VCO), a successive-approximation register (SAR) converter, a Delta-Sigma converter, a flash converter, etc.

In accordance with example embodiments of the invention, the actuator 128 may control the flow of hydraulic fluid or oil for filling or emptying a cylinder. The cylinder may include a piston connected to a valve, and the valve may be controlled by the amount of hydraulic fluid in the cylinder. The position sensor 136 may include an armature that may be mechanically linked to the valve. The armature may couple an excitation signal from an excitation coil to a sensing coil as a function of the position of the valve to indicate the valve position.

Figure 2:
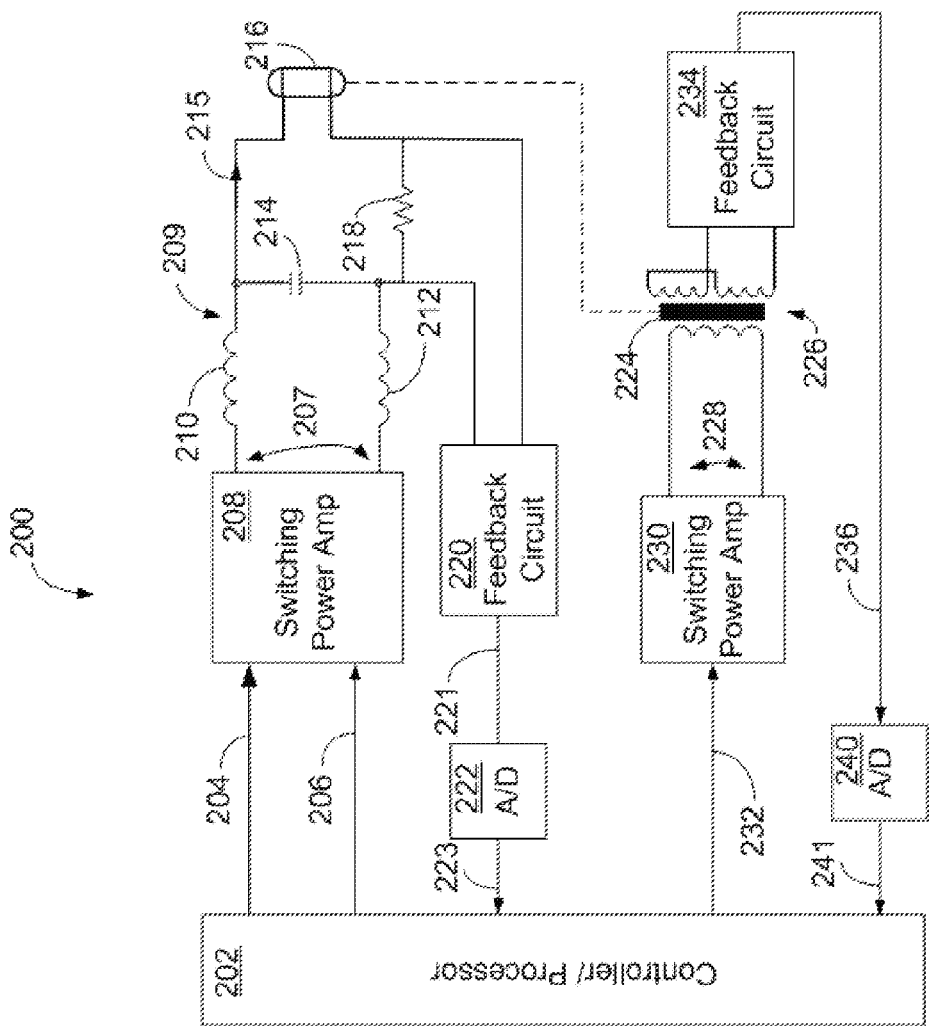
FIG. 2 is a block diagram of an illustrative actuator drive and position sensor excitation circuit, according to an example embodiment of the invention.

FIG. 2 is a block diagram of an illustrative actuator drive and position sensor excitation circuit 200, according to an example embodiment of the invention. In an example embodiment, the circuit 200 may include a controller/processor 202. The controller/processor 202 may provide an actuator reference 204 to a switching power amplifier 208. In accordance with an example embodiment, the actuator reference 204 may be a DC command, or it may be a pulse width modulation signal that is utilized to control the switching power amplifier 208.

In certain example embodiments, the actuator 216 may be of the type that requires a bi-directional or a unidirectional current. Therefore, in accordance with an example embodiment of the invention, the controller/processor 202 may also provide a polarity signal 206 to the switching power amplifier 208 to control the direction of an actuator 216.

According to an example embodiment of the invention, the switching power amplifier 208 may provide a switched drive signal 207, which may be in the form of a pulse width modulation (PWM) signal. One advantage of the PWM drive signal is that the switching power amplifier 208 may generate less heat because the output switching devices (for example, transistors or field effect devices) are either in an "on" or an "off" state. The operation of the device (either on or off) tends to minimize resistive-type heat generation in the device, particularly when compared with linear power amplifiers where the output devices may operate in a state of semi-conduction.

According to example embodiments of the invention, the switching power amplifier 208 may produce a switched drive signal 207 in which the "on duration" of the signal is proportional to commanded current, as provided by the actuator reference signal 204. In certain example embodiments of the invention, the frequency of the switching power amplifier 208 switched drive signal 207 may be on the order of approximately 100 kHz. In other example embodiments of the invention, the switching power amplifier 208 may switch at higher or lower frequencies as required by the switching topology. According to example embodiments, the switched drive signal 207 may be filtered by a low pass filter 209 to produce actuator current 215. In certain example embodiments, the low pass filter 209 may include one or more filter inductors 210, 212, and one or more filter capacitors 214. Other filter components may be included to keep the harmonic distortion of the actuator current to within specified tolerances. For example, the low pass filter 209 may require a total harmonic distortion of less than 1%, and as such, may require additional filtering capacitors 214 or filter inductors 212.

According to an example embodiment, the actuator current 215 may be supplied to an actuator 216, and the actuator current 215 may be sensed for feedback to the controller/processor 202 via a current sense resistor 218 or similar current sensing device. Other example current sensing devices include Hall Effect current sensors, or similar technology. In an example embodiment of the invention, all or part of the actuator current 215 may pass through a sense resistor 218 and may generate a voltage drop across the resistor 218 that may be further processed by a feedback circuit 220. The feedback circuit 220 may include further filtering to remove spikes or other high frequency information that may be problematic for the rest of the circuit to interpret. The feedback circuit 220 may provide a current feedback signal 221 (denoted a second feedback for purposes of this invention) to an analog to digital converter 222, which may provide the digital signal 223 to the controller/processor 202.

Also shown in FIG. 2 are component block diagrams that correspond to the actuator valve or vane position sense circuitry 123 as shown in FIG. 1. In accordance with example embodiments of the invention, the controller/processor 202 may provide an excitation reference signal 232 for controlling a switching power amplifier 230. In an example embodiment, the excitation reference signal 232 may be a sine weighted PWM signal. In other example embodiments, the excitation reference signal 232 may be an analog sine wave, depending on the configuration of the switching power amplifier 230. In accordance with an example embodiment of the invention, the switching power amplifier 230 may produce a switched excitation signal 228 that may be used to drive one or more excitation coils on one or more position sensors 226. The switched excitation signal 228 may be coupled to one or more sensing coils in position sensor 226, and the strength of the coupled signal may depend on the position of a moveable core 224 within the position sensor 226, which in turn may be coupled to the actuator 216.

According to example embodiments of the invention, the excitation signal 228 that is coupled through the position sensor 226 may be further processed by a feedback circuit 234 to produce an excitation signal feedback 236. According to an example embodiment of the invention, the excitation signal feedback 236 may be converted to a digital signal 241 for the controller/processor 202 by an analog to digital converter 240.

In certain example embodiments, the actuator valve or vane position sense circuitry, including a switching power amplifier 230 may provide an alternating current excitation signal 228 of approximately 7 volts root-mean-squared (RMS) and approximately 3.2 kilohertz in frequency. Other amplitudes and frequencies may be generated in accordance with example embodiments of the invention. In certain embodiments of the invention, multiple position sensors 226 may utilize the same excitation signal 228, for example, via an excitation bus, so that a single switching power amplifier 230 circuit may provide the excitation signal 228 for multiple LVDT excitation coils, thereby improving the space and power efficiency of the circuit 200. In example embodiments, the maximum number of position sensors 226 driven by the switching power amplifier 230 may be determined based on the maximum rated power output available from the particular switching power amplifier 230 without having to install a heat sink on the circuitry for heat dissipation.

Figure 3:
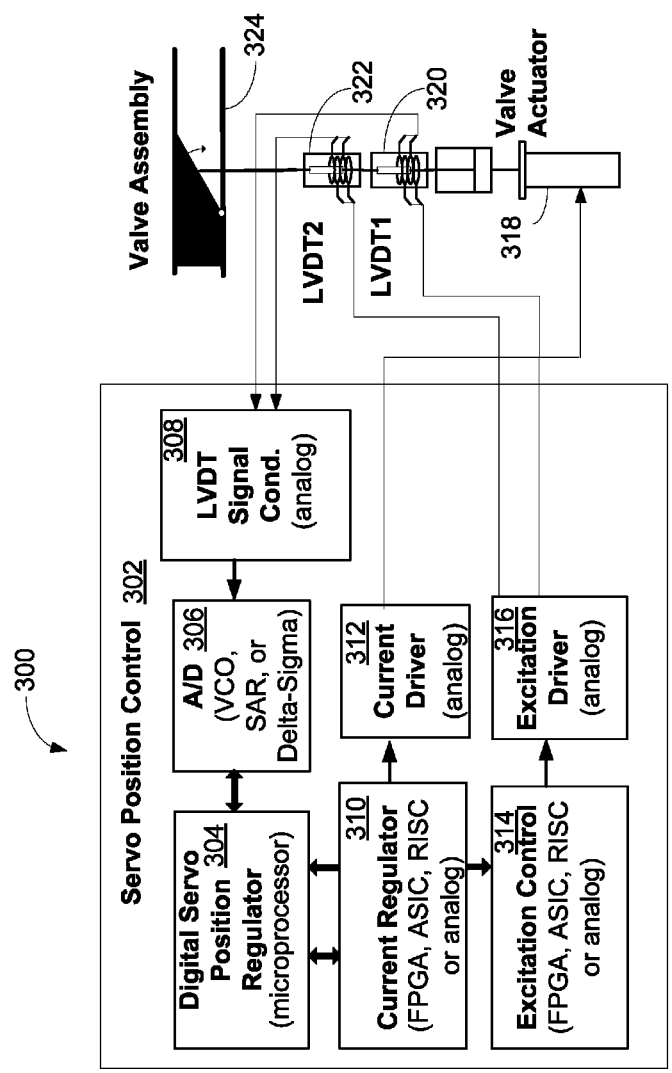
FIG. 3 is a block diagram of an illustrative positioning control system, according to an example embodiment of the invention.

FIG. 3 depicts a positioning servo control system 300, according to another example embodiment of the invention. The positioning servo control system 300 may include a servo position controller 302. According to example embodiments of the invention, the servo position controller 302 may include one or more of: a digital servo position regulator 304, one or more analog to digital converters 306, an position sensor signal conditioning module 308, a current regulator 310, a current driver 312, an excitation controller 314, and/or an excitation driver 316. The servo position controller 302 may provide an actuator switched drive signal for controlling an actuator 318 coupled to a valve assembly 324. The actuator 318 may also be coupled with one or more position sensors 320, 322. In accordance with an example embodiment of the invention, the servo position controller 302 may also provide a switched excitation drive signal for the position sensors 320, 322. In accordance with an example embodiment of the invention, the position sensors 320, 322 may provide position feedback to the servo position controller 302 in response to the position of the actuator 318.

Figure 4:
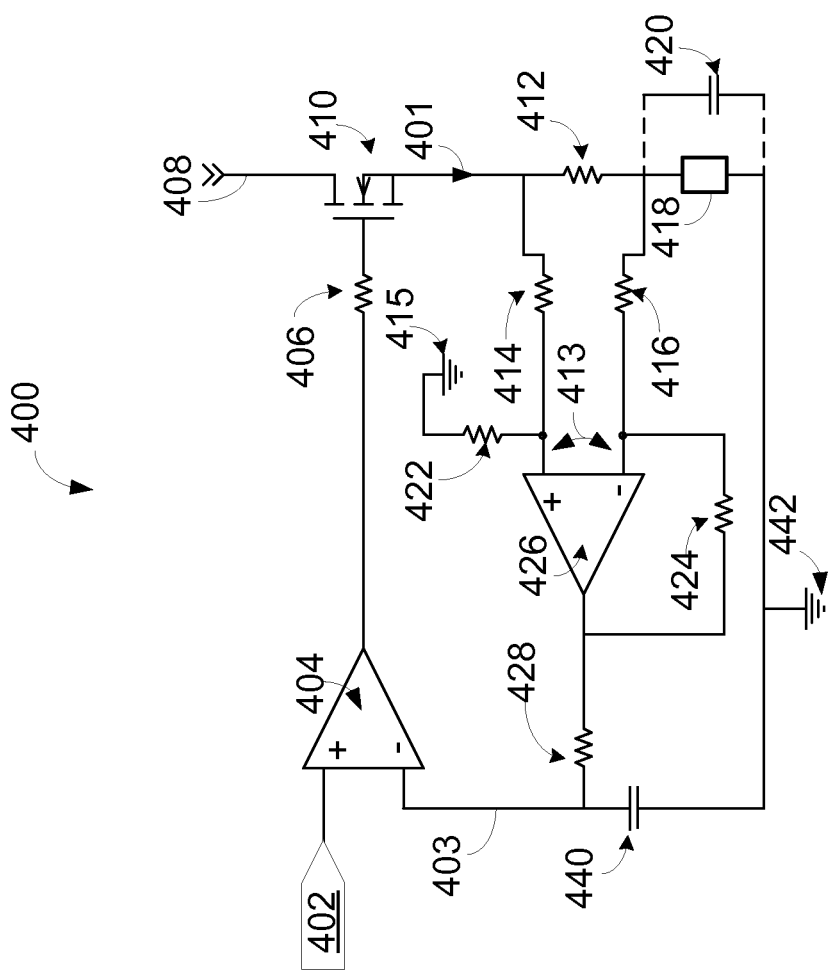
FIG. 4 is a circuit diagram of an illustrative switching servo actuator circuit with hysteretic control, according to an example embodiment of the invention.

FIG. 4 depicts an example circuit diagram of an illustrative switching servo actuator circuit 400 with hysteresis control, according to an example embodiment of the invention. Unlike a pulse width modulation switching circuit (where the switching frequency is constant but the "on" duration is adjusted to supply the desired average current), the circuit 400 may provide "on" and "off" switching via the output driver 410, but may adjust the average output drive current 401 in proportion to the command reference voltage 402 without necessarily maintaining a constant switching frequency. According to example embodiments of the invention, the circuit 400 may operate in response to an analog command reference voltage 402, and regulation of the output drive current 401 may be provided by an analog feedback loop, but the output driver 410 component may be switched ("on" and "off") to minimize the heat dissipation and improve the efficiency.

In accordance with an example embodiment, a command reference voltage 402 may be received on the non-inverting lead of a first operational amplifier 404, which may provide a switching drive signal to the gate of an output driver 410 via a gate resistor 406. According to example embodiments, the output driver 410 may be a metal oxide semiconductor field effect transistor (MOSFET), or another similar switching device. When the output driver 410 is activated (or conducting), output drive current 401 may flow from the power supply 408 through the output driver 410 through a sense resistor 412, and through an actuator 418 or load. In accordance with an example embodiment, a feedback circuit, built around a second operational amplifier 426, may monitor the voltage across the sense resistor 412.

According to example embodiments of the invention, and with continued reference to FIG. 4, the feedback loop may also include a filter capacitor 420. Gain for multiplying the voltage across the sense resistor 412 on the second operational amplifier 426 may be set by gain resistors 414, 416, 422 and/or 424. According to example embodiments, the switching servo actuator circuit 400 may also include a feedback delay resistor 428 and a feedback delay capacitor 440, which may provide a conditioned feedback signal 403 for input to the inverting terminal of the first operational amplifier 404. In accordance with example embodiments of the invention, the first operational amplifier 404 may compare the conditioned feedback signal 403 voltage against the command reference voltage 402 and, based on the discrepancy, may adjust the duty-cycle of the first operational amplifier 404 in a way that will reduce the discrepancy to zero. Feedback delay resistor 428 and a feedback delay capacitor 440 may delay the feedback signal 413, introducing hysteresis. The resulting output drive current 401 may be a direct current (DC) with a small triangular waveform superimposed on it. The triangular waveform may be a result of the switching nature of the output driver 410. In accordance with an example embodiment of the invention, the amplitude of the superimposed triangular wave may be reduced by increasing the value of the filter capacitor 420. In certain embodiments, the filter capacitor 420 may be approximately 1 microfarad or greater to provide a smooth output drive current 401 for the load, which may be an actuator 418.

In accordance with example embodiments of the invention, the voltage drop across the sense resistor 412 may be based on sensing output drive current 401 through the actuator 418 by measuring a voltage drop across a sense resistor 412. According to an example embodiment, the feedback signal 413 may be amplified and filtered to produce a conditioned feedback signal 403. In certain embodiments, the drive current, and in turn, the feedback signal 413 may filtered by introducing additional parallel filter capacitor 420 in parallel with the actuator 418. In accordance with an example embodiment of the invention, the conditioned feedback signal 403 may include delaying the feedback signal 403 and filtering the feedback signal 403. In certain embodiments a conditioned feedback signal 403 may include modifying the time constant of the feedback signal 413. In certain embodiments, modifying the time constant may be based at least in part on adjusting resistance and/or capacitance associated with the feedback loop. In certain embodiments, the conditioned feedback signal 413 is determined based at least in part on determining output drive current 401 through the actuator 418.

In certain embodiments, the switching servo actuator circuit 400 may be modified with a dual (positive and negative) supply to provide bi-directional control of the output drive current 401.

Figure 5:
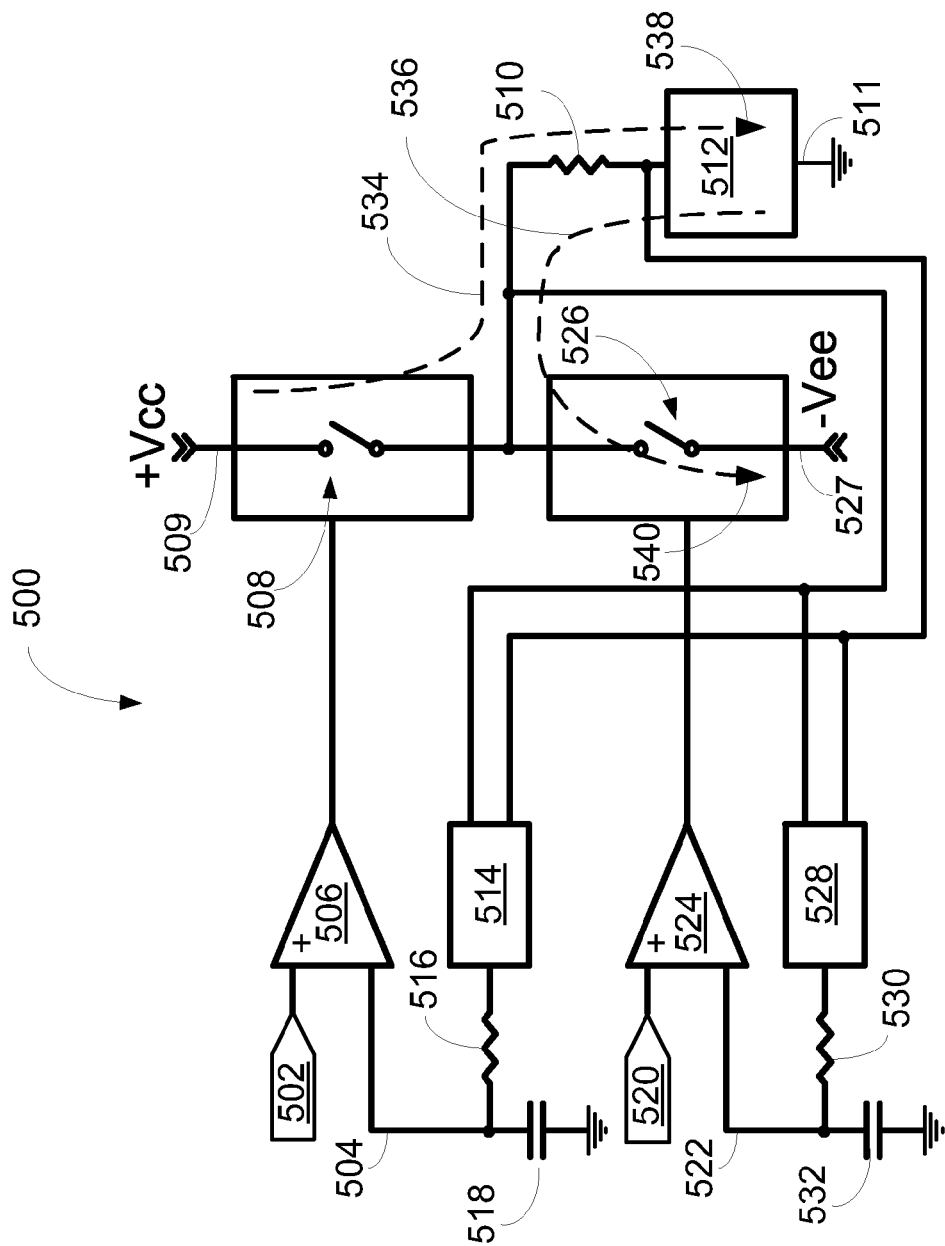
FIG. 5 is a circuit diagram of an illustrative bi-directional current switching circuit, according to an example embodiment of the invention.

FIG. 5 depicts a bi-directional current switching circuit 500, according to an example embodiment of the invention. The example circuit 500 may provide bi-directional current for a load 512 in response to a first switch control signal 502 and/or a second switch control signal 520. In example embodiments, the first switch control signal 502 and/or a second switch control signal 520 may include pulse width modulation signals. In example embodiments, the load 512 may be an actuator, such as 318 in FIG. 3. In example embodiments of the invention, the first switch control signal 502 and second switch control signal 520 would be coordinated such that the first switching device 508 and the second switching device 526 would not both be closed at the same time.

In an example embodiment, positive current 538 may be supplied to the load 512 via a positive current path 534 when the first switch control signal 502 voltage is greater than the first current feedback signal 504 voltage. In certain embodiments, a first operational amplifier 506 (or comparator, for example) may be utilized to provide switching logic or current for controlling a first switching device 508, depending on input voltages 502, 504 to the first operational amplifier 506. According to an example embodiment, when the first switching device 508 is in a closed state, current 538 from the positive voltage power supply 509 may flow through the positive current path 534, and through the load 512 via a sense resistor 510. In an example embodiment, the current flowing through the sense resistor 510 may cause a voltage drop across the sense resistor 510, and the voltage drop may be measured and utilized for feedback. For example, in an embodiment of the invention, a first current feedback signal 504 may be based on the voltage drop presented to differential input terminals of a first differential operational amplifier 514. In an example embodiment of the invention, the output of the first differential operational amplifier 514 may be filtered, for example, by a first filter resistor 516 and a first filter capacitor 518 to produce the first current feedback signal 504 for input to the first operational amplifier 506.

In a similar arrangement, and according to an example embodiment of the invention, negative current 540 may be supplied to the load 512 via a negative current path 536 when the second switch control signal 520 voltage is greater than a second current feedback signal 522 voltage. In certain embodiments, a second operational amplifier 524 (or comparator, for example) may be utilized to provide switching logic or current for controlling a second switching device 526, depending on input voltages 520, 522 to the second operational amplifier 524. According to an example embodiment, when the second switching device 526 is in a closed state, current 540 from the negative voltage power supply 527 may flow through the negative current path 536 and through the sense resistor 510 via the load 512. In an example embodiment, the current flowing through the sense resistor 510 may cause a voltage drop across the sense resistor 510, and the voltage drop may be measured and utilized for feedback. For example, in an embodiment of the invention, a second current feedback signal 522 may be based on the voltage drop presented to differential input terminals of a second differential operational amplifier 528. In an example embodiment of the invention, the output of the second differential operational amplifier 528 may be filtered, for example, by a second filter resistor 530 and a second filter capacitor 532 to produce the second current feedback signal 522 for input to the second operational amplifier 524.

In certain embodiments, the load 512 may include additional filtering components, including passive components such as capacitors, inductors, and resistors. In certain embodiments, the load 512 may include active filtering components. According to example embodiments of the invention, the bi-directional current switching circuit 500 may be utilized for controlling the polarity (or direction) of actuation in an actuator. In an example embodiment of the invention, the first switch control signal 502 and/or the second switch control signal 520 may include pulse width modulation (PWM) signals, which may be utilized to control the speed or force of the actuator. According to example embodiments, the positive current path 534 and the negative current path 536 may be set mutually exclusive to avoid shorting the positive voltage power supply 509 with the negative voltage power supply 527.

In certain embodiments of the invention, and with reference to the dual power supply configuration of FIG. 5, manipulating one or more switching devices 508, 526 to establish at least one positive current path 534 and/or at least one negative current path 536 comprises coordinating at least two switching devices 508, 526, where at least one of the switcheing devices 508, 526 is in an open state to avoid short circuiting a power supply 509, 527. According to example embodiments of the invention, two or more switching devices 508, 526 may be utilized to control current through an actuator load 512, and during operation of the actuator, at least one of the switching devices 508, 526 may be in an open state to avoid short circuiting a power supply 509, 527. Certain embodiments of the invention may include a controller that may be configured to switchably control current 538, 540 by coordinating at least a first switching device 508, and a second switching device 526. According to example embodiments, at least one of the switching devices 508, 526 are in an open state, and at least one of the switching devices 508, 526 are operable to control the drive current 538, 540 based at least in part on pulse width modulation. In certain embodiments, a controller may be configured to switchably control current 538, 540 by coordinating at least a first switching device 508, and a second switching device 526. In an example embodiment, at least one of the switching devices 508, 526 are in an open state, and wherein at least one of the devices 508, 526 are operable to control the drive current 538, 540 based at least in part on pulse width modulation.

According to certain embodiments of the invention, and with reference to either FIG. 5 or FIG. 6, the current 538, 540, 617, 619 may be controlled by at least one switching device 508, 526, 610, 612, 614, 616 associated with at least one positive current path 534, 620 or at least one negative current path 536, 622. In certain embodiments, the current 538, 540, 617, 619 may be controlled using pulse width modulation. In an example embodiment, one or more switching devices 508, 526, 610, 612, 614, 616 may be manipulated to establish at least one positive current path 534, 620 and at least one negative current path 536, 622 such that the current paths are mutually exclusive. In certain embodiments, the mutually exclusive current paths 534, 536, 620, 622 may be completed by the actuator 512, 618. According to example embodiments, two or more switching devices 508, 526, 610, 612, 614, 616, such as metal oxide semiconductor field-effect transistors (MOSFETs), may be utilized to control bi-directional current. In accordance with other example embodiments of the invention, other various semiconductor and/or solid state switching devices may be utilized as the switching devices 508, 526, 610, 612, 614, 616. In certain embodiments, freewheeling diodes, capacitors, inductors, and other components may be included and associated with the switching devices.

In accordance with example embodiments of the invention, and with reference to FIG. 6, positive and/or negative current 617, 619 may be controlled by coordinating at least four switching devices 610, 612, 614, 616 in an H-bridge configuration such that at least two of the four switcheing devices are in an open state, and at least one of the other two switching devices controls the current based at least in part on pulse width modulation. According to certain embodiments of the invention, a positive current path 620 may include a first switching device 610 and a fourth switching device 616, and a negative current path 622 may include a second switching device 614 and a third switching device 612. In certain embodiments, a controller 102 may be configured to control positive drive current 619 by controlling either the first switching device 610 or the fourth switching device 616. In certain embodiments, the controller may be further configured to control negative drive current 617 by controlling either the second switching device 614 or the third switching device 612. In certain embodiments, the conduction states of the first switching device 610 and third switching device 612 are mutually exclusive, the conduction states of the second switching device 614 and fourth switching device 616 are mutually exclusive.

Certain embodiments of the invention may include a controller that may be configured to switchably control current 617, 619 by coordinating at least a first switching device 610, a second switching device 614, a third switching device 612, and a fourth switching device 616. In example embodiments of the invention, at least two of the four switching devices 610, 612, 614, 616 may be in an open state, and at least one of the remaining two switching devices is operable to control the drive current 617, 619 based at least in part on pulse width modulation. In certain embodiments, current may flow through a positive current path 620 which may include first switching device 610 and a fourth switching device 616. In certain embodiments, current may flow through a negative current path 622 which may include a second switching device 614 and a third switching device 612.

Embodiments of invention provide a positive current path 620, which may include a first switching device 610 and a fourth switching device 616. Embodiments of the invention may include a negative current path 622, which may include a second switching device 614 and a third switching device 612. According to an example embodiment, a controller may be configured to control positive drive current 619 by controlling either the first switching device 610 or the fourth switching device 616. According to an example embodiment, the controller may be configured to control negative drive current 617 by controlling either the second switching device 614 or the third switching device 612. According to example embodiments of the invention, the conduction states of the first switching device 610 and third switching device 612 are mutually exclusive, and the conduction states of the second switching device 614 and fourth switching device 616 are mutually exclusive.

FIG. 6 depicts a circuit diagram of an illustrative H-bridge, according to an example embodiment of the invention. In accordance with example embodiments of the invention, a voltage source 602 may be utilized to supply current through the actuator 618 (which may be an actuator, for example, as in 318 of FIG. 3) via a combination of a first switching device 610, a second switching device 612, a third switching device 614 and/or a fourth switching device 616. According to example embodiments of the invention, the state of the first switching device 610 may be controlled by a first switch drive signal 604 and the state of the third switching device 614 may be controlled by a second switch drive signal 606. In accordance with an example embodiment of the invention, the state of the third switching device 612 and the fourth switching device 616 may be controlled by a direction/polarity control signal 608, and an inverter 609. It should be readily apparent that the polarity control signal 608 and the inverter 609 may be applied to the first and second switching devices (610, 614), while drive signals (604, 606) may be applied to the third and fourth switching devices (612, 616). Thus, in accordance with another example embodiment of the invention, the state of the first switching device 610 and the second switching device 612 may be controlled by a direction/polarity control signal 608 and an inverter 609. Accordingly, in a related example embodiment, the third switching device 612 may be controlled by the first switch drive signal 604. Likewise, the fourth switching device 616 may be controlled instead by a second switch drive signal. In other example embodiments of the invention, separate individual switch drive signals may be utilized to control each of the switching devices (610, 612, 614, 616).

In certain example embodiments of the invention, the conduction state of the pairs of switching devices (610 and 616) or (614 and 612) may be utilized to control the direction of current through the actuator 618. In certain embodiments, measures may be taken to insure that the third switching device 612 is never conducting at the same time as the first switching device 610, and similarly, the second switching device 614 and the fourth switching device 616 should not be in a state of conduction at the same time.

FIG. 6 depicts an H-bridge circuit topology that, in certain embodiments, may utilize the PWM switching concepts, as discussed above with reference to FIG. 5, to enable bi-directional control of an actuator. Additional descriptions of this PWM control embodiment will be discussed with reference to FIGS. 7 and 8 below. According to example embodiments, the H-bridge circuit topology of FIG. 6 may also utilize the hysteretic switching concepts, as discussed above with reference to FIG. 4. For example, the first switching device 610 and the second switching device 614 in FIG. 6 may include some of all of the components of FIG. 4, with the switching devices 610, 614 of FIG. 6 corresponding to the output driver 410 of FIG. 4. Tying this concept to FIG. 2, it should be readily apparent that the direction/polarity control 206 of FIG. 2 may correspond to the direction/polarity control signal 608 of FIG. 6. The H-bridge circuit topology may also be applied to other hysteretic control and pulse width modulation switching devices and circuits as discussed previously with reference to FIGS. 2 and 3, in accordance with embodiments of the invention.

According to an example embodiment, Q-only pulse width modulation (PWM) control may be used to control current for driving an actuator 618, as in FIG. 6. According to an example embodiment, a positive current 619 may be controlled through an actuator 618 by closing a fourth switching device 616 to dictate the current polarity. The magnitude of positive current 619 may be controlled via a first switching device 610. In an example embodiment, the positive current 619 may be controlled by turning the first switching device 610 on and off as a function of Q-only PWM as shown in FIG. 7. In an example embodiment of the invention, the second switching device 614 and third switching device 612 may remain in an open state at all times while positive current 619 is being commanded.

A similar approach may be utilized for controlling negative current 617 through the actuator 618. For example, and according to an example embodiment, the third switching device 612 may stay closed to dictate the current polarity while the second switching device 614 turns on and off via nQ-only PWM (as shown in FIG. 8) to control the magnitude of the negative current 617. In an example embodiment of the invention, the first switching device 610 and fourth switching device 616 may remain in an open state at all times while negative current 617 is being commanded.

With reference to FIG. 5, and according to an example embodiment, Q-only PWM control (as depicted in FIG. 7) may be used to turn on and off a switching device 508 to control positive current 538 through an actuator or load 512. In this embodiment, where a positive current path 534 is established, switching device 540 may remain in an open state.

Likewise in FIG. 5, for a negative current path 536, and according to an example embodiment, nQ-only PWM (as depicted in FIG. 8) may be utilized to turn switching device 526 on and off to control negative current 540. For this example embodiment, switching device 508 may remain in an open state.

In accordance with example embodiments of the invention, bi-directional drive current 617, 619 through an actuator 618 may include manipulating and/or coordinating one or more switching devices 610, 612, 614, 616, to establish at least one positive current path 620 and at least one negative current path 622 through the actuator 618. According to example embodiments, a conditioned feedback signal, such as 403 in FIG. 4, based at least on current 617, 619 associated with the actuator 618 may be provided, and current 617, 619 through the actuator 618 may be controlled based at least in part on the a conditioned feedback signal, such as 403 in FIG. 4. In accordance with example embodiments of the invention, the actuator current 617, 619 may be controlled based on a comparison of the conditioned feedback signal, such as 403 in FIG. 4, and a reference signal, such as command reference voltage 402 in FIG. 4. In certain embodiments, controlling the current 617, 619 may further include coordinating at least four switching devices 610, 612, 614, 616, wherein at least two of the four switching devices are in an open state, and at least one of the other two switching devices controls the current based at least in part on the percentage of time in a closed state. In certain example embodiments, the current 617, 619 may be controlled by controlling at least one switching devices associated with at least one positive current path 620 or at least one negative current path 622. In certain embodiments of the invention, one or more switching devices 610, 612, 614, 616 may be manipulated to establish at least one positive current path 620 and at least one negative current path 622. In an example embodiment, two mutually exclusive current paths may be bridged with the actuator 618. In accordance with certain example embodiments of the invention, controlling current 617, 619 may be achieved by using hysteretic control, such as depicted in FIG. 4.

Certain example embodiments of the invention may include a system for controlling bi-directional drive current 617, 619. The system may include an actuator 618, a voltage source 602, at least one positive current path 620 and at least one negative current path 622 through the actuator 618, and a controller, such as 102 in FIG. 1, configured to manipulate the current paths 620, 622 and control current 617, 619 based at least in part on a conditioned feedback signal, such as 403 in FIG. 4, associated with the actuator 618. In certain embodiments, the controller, such 102 in FIG. 1, is further configured to manipulate the current paths 620, 622 and control current 617, 619 based on a comparison of the condition feedback signal, such as 403 in FIG. 4, and a reference signal, such as command reference voltage 402 in FIG. 4. In certain example embodiments, the positive current path 620 comprises a first switching device 610 and a fourth switching device 616, and the negative current path 622 comprises a second switching device 614 and a third switching device 612. In certain example embodiments, the controller, such as 102 in FIG. 1, is further configured to control positive drive current 619 by controlling either the first switching device 610 or the fourth switching device 616, and the controller, such as 102 in FIG. 1, is further configured to control negative drive current 617 by controlling either the second switching device 614 or the third switching device 612.

According to certain example embodiments, the controller, such as 102 in FIG. 1, is further configured to control conduction states of the switching devices 610, 612, 614, 616. In certain example embodiments, the conduction states of the first switching device 610 and third switching device 612 are mutually exclusive, and the conduction states of the second switching device 614 and fourth switching device 616 are mutually exclusive. In certain example embodiments, the controller, such as 102 in FIG. 1, is further configured to switchably control current 617, 619 by coordinating at least a first switching device 610, a second switching device 614, a third switching device 612, and a fourth switching device 616. According to example embodiments, at least two of the four switching devices 610, 612, 614, 616 are in an open state, and at least one of the remaining two switching devices is operable to control the drive current 617, 619 based at least in part on the percentage of time in a closed state. In certain example embodiments, the controller 102 is further configured to control current 617, 619 based at least in part on hysteretic control, such as depicted in FIG. 4.

According to an example embodiment, hysteretic control, as discussed above with reference to FIG. 4, may be used to control current for driving an actuator 618. For example, a positive current 619 may be controlled by closing a fourth switching device 616 to dictate the current polarity. The magnitude of positive current 619 may be controlled via a first switching device 610. In an example embodiment, the positive current 619 may be controlled by turning the first switching device 610 on and off as a function of hysteretic control loop action, as discussed with reference to FIG. 4 above. In an example embodiment of the invention, the second switching device 614 and third switching device 612 may remain in an open state at all times while positive current 619 is being commanded by the hysteretic control loop.

A similar approach may be utilized for controlling negative current 617 through the actuator 618. For example, and according to an example embodiment, the third switching device 612 may stay closed to dictate the current polarity while the second switching device 614 turns on and off via hysteretic control loop action to control the magnitude of the negative current 617. In an example embodiment of the invention, the first switching device 610 and fourth switching device 616 may remain in an open state at all times while negative current 617 is being commanded.

According to certain example embodiments, and with continued reference to FIG. 6, a circuit is provided for controlling bi-directional drive current 617, 619 through an actuator 618. The circuit may include at least one positive current path 620 and at least one negative current path 622 through the actuator 618, and a controller, such as 102 in FIG. 1, configured to manipulate the current paths 620, 622 and control current 617, 619 based at least in part on a conditioned feedback signal, such as 403 in FIG. 4, associated with the actuator 618. According to example embodiments, the controller, such as 102 in FIG. 1, may be further configured to manipulate the current paths 620, 622 and control current 617, 619 based on a comparison of the feedback and a reference signal. In certain example embodiments, a positive current path 620 may include a first switching device 610 and a fourth switching device 616, and the negative current path 622 may include a second switching device 614 and a third switching device 612.

According to certain example embodiments, the controller, such as 102 in FIG. 1, may be further configured to control positive drive current 619 by controlling either the first switching device 610 or the fourth switching device 616, and the controller may further be configured to control negative drive current 617 by controlling either the second switching device 614 or the third switching device 612. In certain example embodiments, the controller, such as 102 in FIG. 1, may be further configured to control conduction states of the switching devices 610, 612, 614, 616. In certain embodiments of the invention, the conduction states of the first switching device 610 and third switching device 612 are mutually exclusive, and the conduction states of the second switching device 614 and the fourth switching device 616 are mutually exclusive. In accordance with certain embodiments of the invention, the controller 102 may be further configured to control drive current 617, 619 by coordinating the switching devices 610, 612, 614, 616, wherein at least two of the four switching devices 610, 612, 614, 616 are in an open state, and at least one of the other two switching devices is operable to control the current 617, 619 based at least in part on the percentage of time in a closed state.

FIG. 7 and FIG. 8 respectively depict example timing charts for positive current switching control 700 and negative current switching control 800, according to example embodiments of the invention. Example embodiments of these timing charts may be applied to Q-only pulse width modulation (PWM) control embodiments of the invention. In accordance with embodiments of the invention, these example timing charts may be applicable to embodiments discussed above with respect to the actuator bi-directional current switching circuit 500 of FIG. 5, and/or to the H-bridge circuit 600 of FIG. 6. These figures represent example switch states (ON or OFF) for two switching devices in series, as a function of time. The indicated switching states may provide reconfigurable conduction paths for actuators, such as 318 in FIG. 3, to control polarity and average drive current, which may, in turn, be used to control the respective actuation direction, and to control the speed or force of the actuator.

According to an example embodiment, and as indicated in FIG. 7, the switching devices may be controlled according to Q-only PWM switching device states. For example, a first switching device (such as 610 in one leg of an H-bridge, such as 620 in FIG. 6, or in a first switching device 508 of FIG. 5) may be controlled in accordance with a first switching device state 702 as a function of time. FIG. 7 also indicates a second switching device state 704 (such as 616 in the same arm of an H-bridge, or such as 620 in FIG. 6). According to an example embodiment, the second switching device state 704 may be steady "ON" when driving the actuator in one direction, and therefore, this feature distinguishes the invention from conventional PWM switching, where the second switching device is typically PWM switched.

In accordance with example embodiments of the invention, the duty cycle of the first switching device state 702 may be adjusted as needed to provide the desired average current through the actuator. According to example embodiments of the invention, when the switching devices are configured to route positive current, such as 619 in FIG. 6, through an actuator (such as 618 via switching devices, such as 610 and 616 in FIG. 6), the switching devices in the other leg of the H-bridge (such as 614 and 612 in FIG. 6) may be in an open state to avoid shorting the power supply.

FIG. 8 indicates a similar example timing chart for nQ-only PWM negative current switch states 800. According to an example embodiment, a first (negative current) switching device (such as 614 in one leg of an H-bridge, such as 622 in FIG. 6, or in a second switching device 526 of FIG. 5) may be controlled in accordance with a first negative switching device state 804 as a function of time. FIG. 8 also indicates a second negative switching device state 802 for a second (negative current) switching device (such as 612 in the same arm of an H-bridge, such as 622 in FIG. 6). According to an example embodiment, the second negative switching device state 802 may be steady "ON" when driving the actuator in one direction, and therefore, this feature distinguishes the invention from conventional PWM switching, where the second switching device is typically PWM switched.

In accordance with example embodiments of the invention, the duty cycle of the first negative switching device state 804 may be adjusted as needed to provide the desired average negative current through the actuator. According to example embodiments of the invention, when the switching devices are configured to route negative current, such as 617 in FIG. 6, through an actuator (such as 618 via switching devices, such as 612 and 614 in FIG. 6), the switching devices in the other leg of the H-bridge (such as 610 and 616 in FIG. 6) may be in an open state to avoid shorting the power supply.

Figure 9:
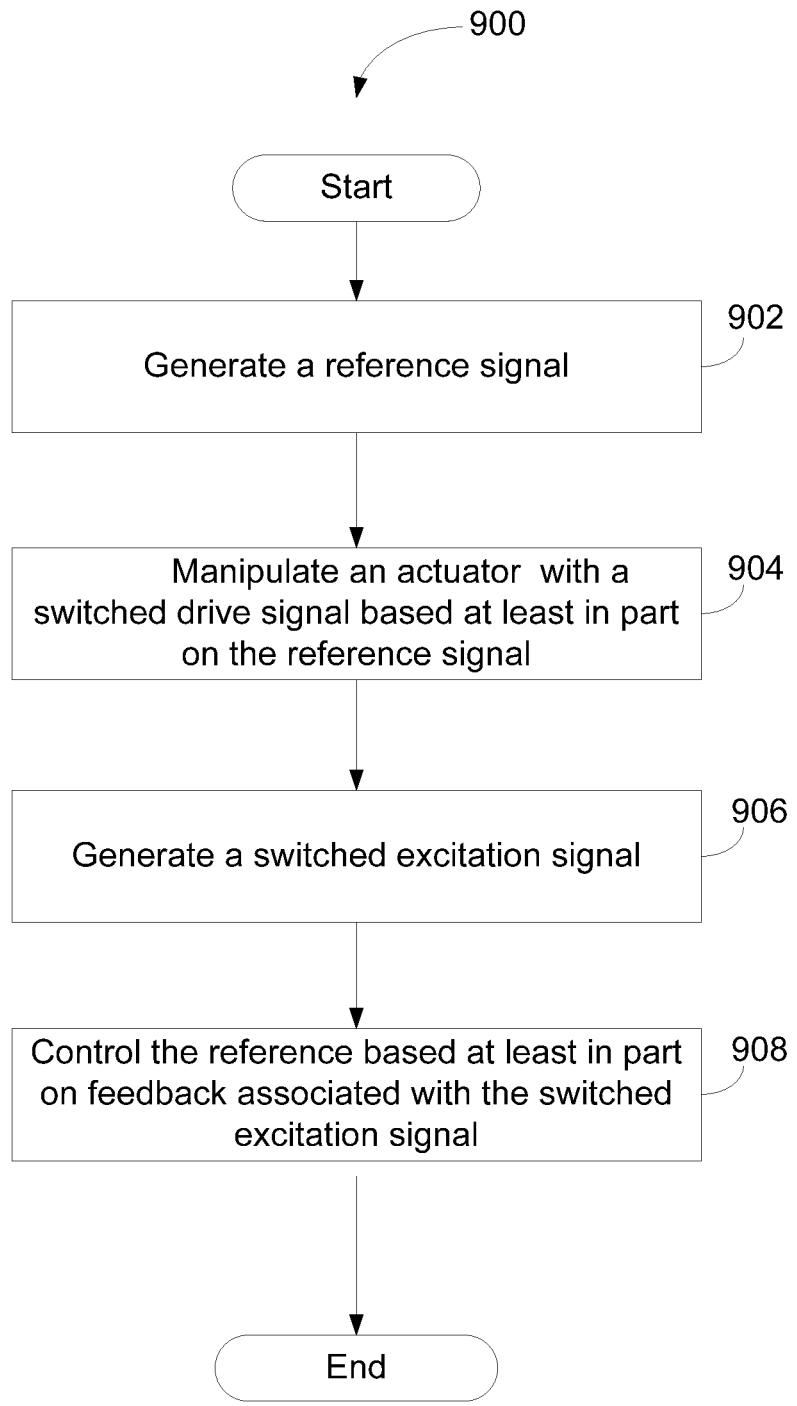
FIG. 9 is a flow diagram of an example method, according to an example embodiment of the invention.

An example method 900 for controlling an actuator will now be described with reference to the flow diagram of FIG. 9. The method starts in block 902 where according to an example embodiment of the invention, a reference signal is generated. In block 904 and according to an example embodiment of the invention, an actuator is manipulated with a switched drive signal based at least in part on the reference signal. In block 906, and according to an example embodiment, a switched excitation signal is generated. In block 908 and according to an example embodiment, the reference is controlled based at least in part on the feedback associated with the switched excitation signal. The method 900 ends after block 908.

Figure 10:
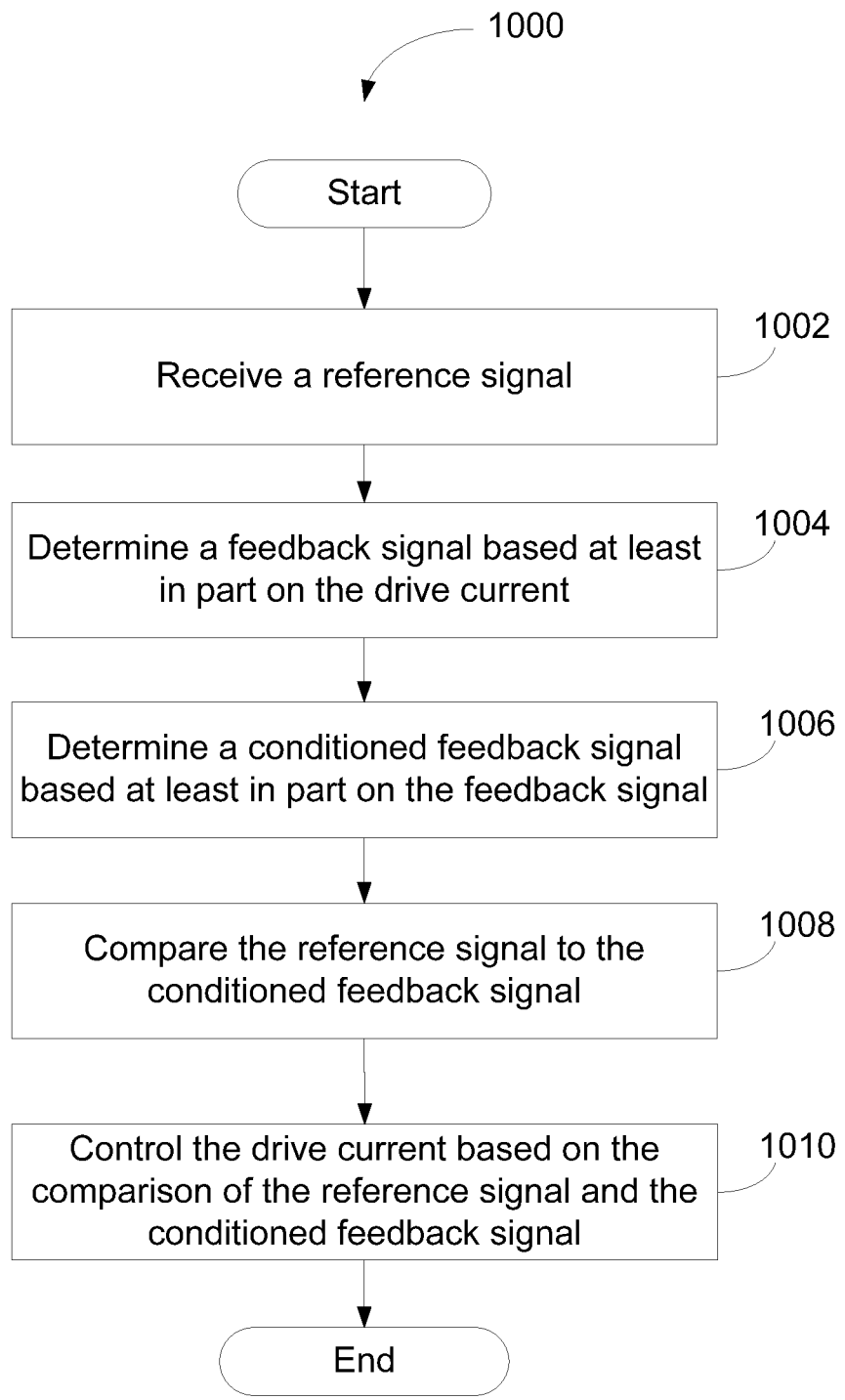
FIG. 10 is a flow diagram of another example method, according to an example embodiment of the invention.

An example method 1000 for controlling actuator drive current will now be described with reference to the flow diagram of FIG. 10. The method starts in block 1002 where according to an example embodiment of the invention, the method may include receiving a reference signal. In block 1004, the method may include determining a feedback signal based at least in part on the drive current. In block 1006, the method may include determining a conditioned feedback signal based at least in part on the feedback signal. In block 1008, the method may include comparing the reference signal to the conditioned feedback signal. In block 1010, the method may include controlling the drive current based on the comparison of the reference signal and the conditioned feedback signal. The method 1000 ends after block 1010.

Figure 11:
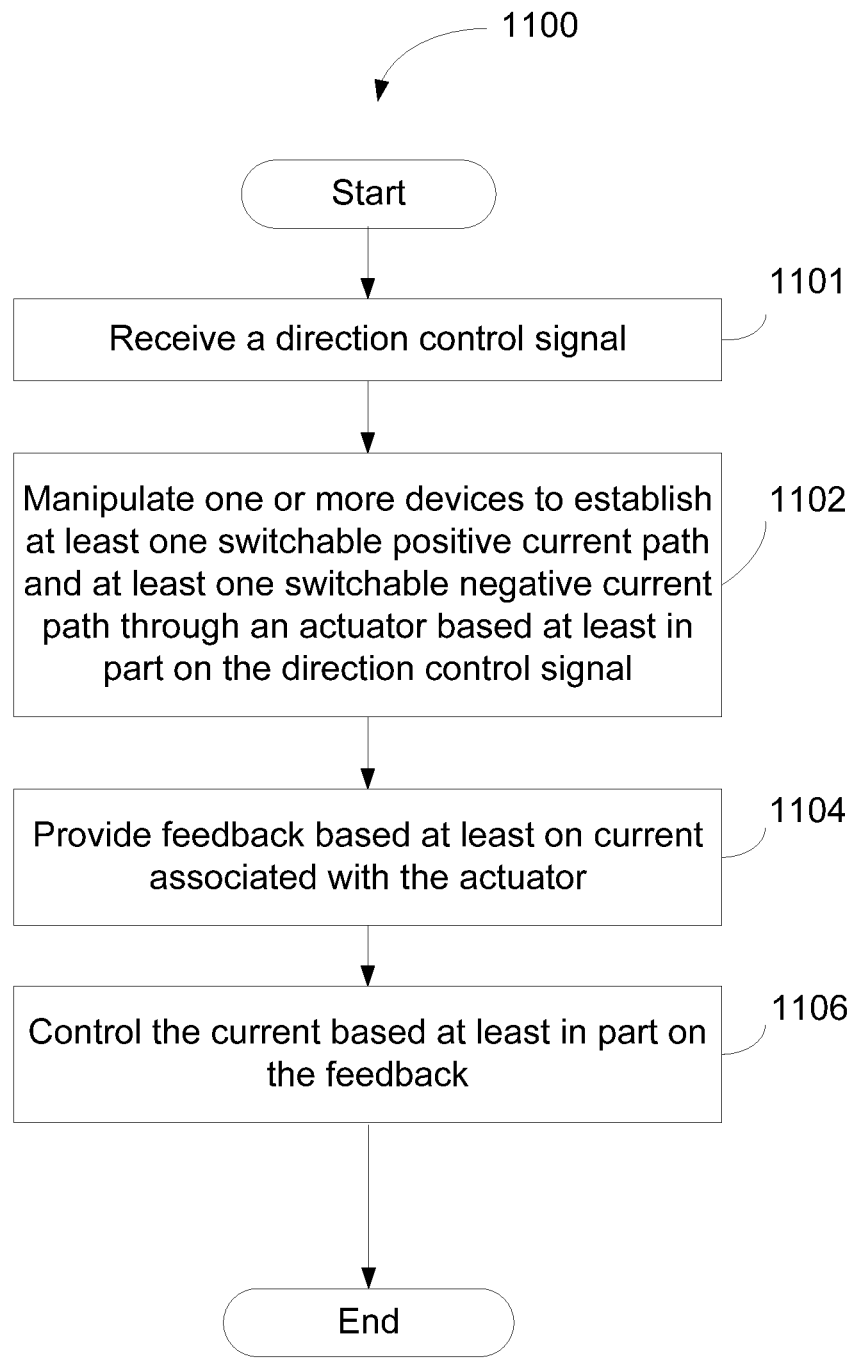
FIG. 11 is a flow diagram of another example method, according to an example embodiment of the invention.

An example method 1100 for controlling bi-directional drive current through an actuator will now be described with reference to the flow diagram of FIG. 11. The method starts in block 1101 where according to an example embodiment of the invention, the method may include receiving a direction control signal. In block 1102, the method may include manipulating one or more devices to establish at least one switchable positive current path and at least one switchable negative current path through an actuator based at least in part on the direction control signal. In block 1104, the method may include providing feedback based at least on the current associated with the actuator. In block 1106, the method may include controlling the current based at least in part on the feedback. The method 1100 ends after block 1106.

Figure 12:
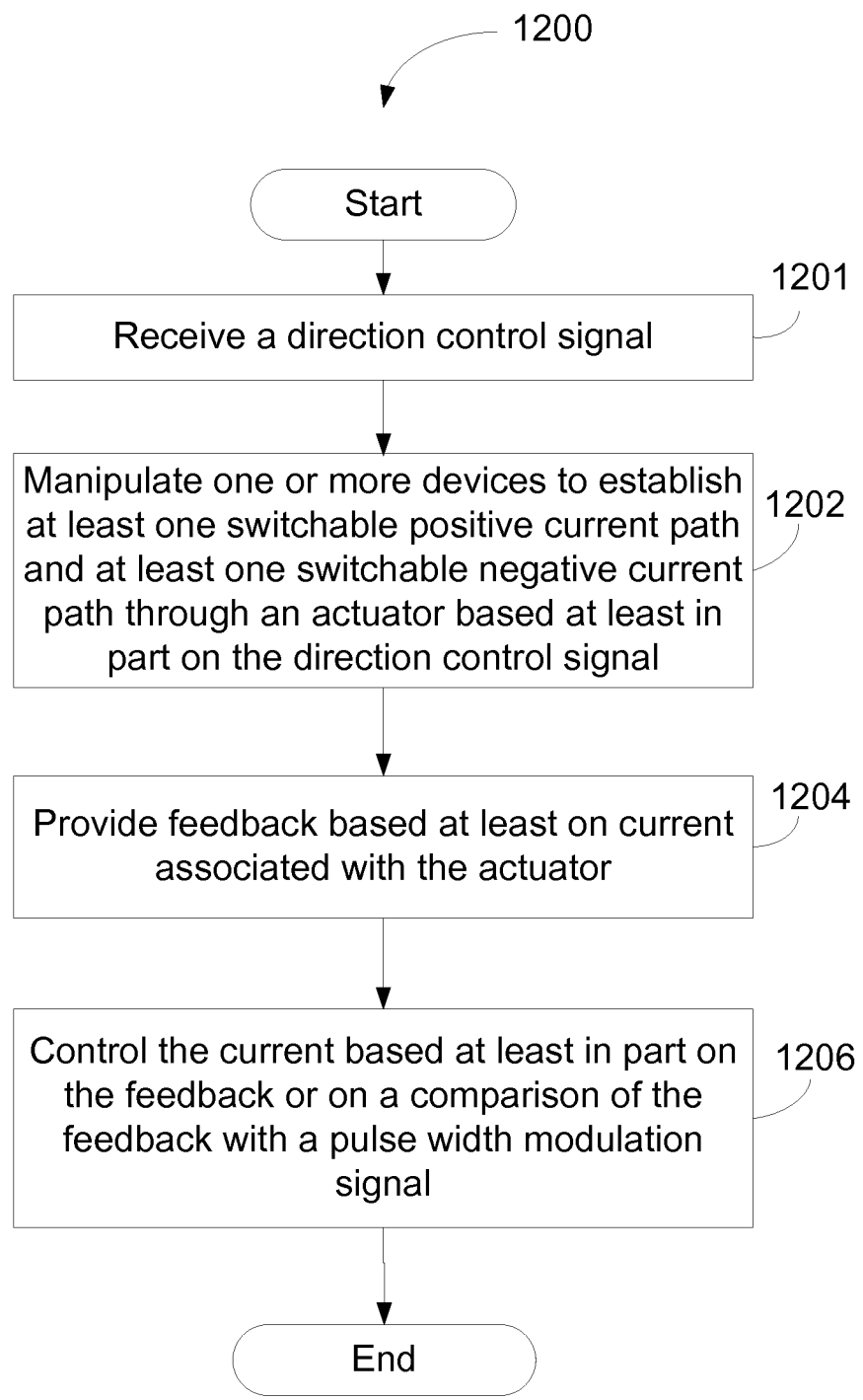
FIG. 12 is a flow diagram of another example method, according to an example embodiment of the invention.

An example method 1200 for controlling actuator drive current will now be described with reference to the flow diagram of FIG. 12. The method starts in block 1201 where according to an example embodiment of the invention, the method may include receiving a direction control signal. In block 1202, the method may include manipulating one or more devices to establish at least one switchable positive current path and at least one switchable negative current path through an actuator based at least in part on the direction control signal. In block 1204, and according to an example embodiment of the invention, the method may include providing feedback based at least on the current associated with the actuator. In block 1206, the method may include controlling the current based at least in part on the feedback or on a comparison of the feedback with a pulse width modulation signal. The method 1200 ends after block 1206.

Figure 13:
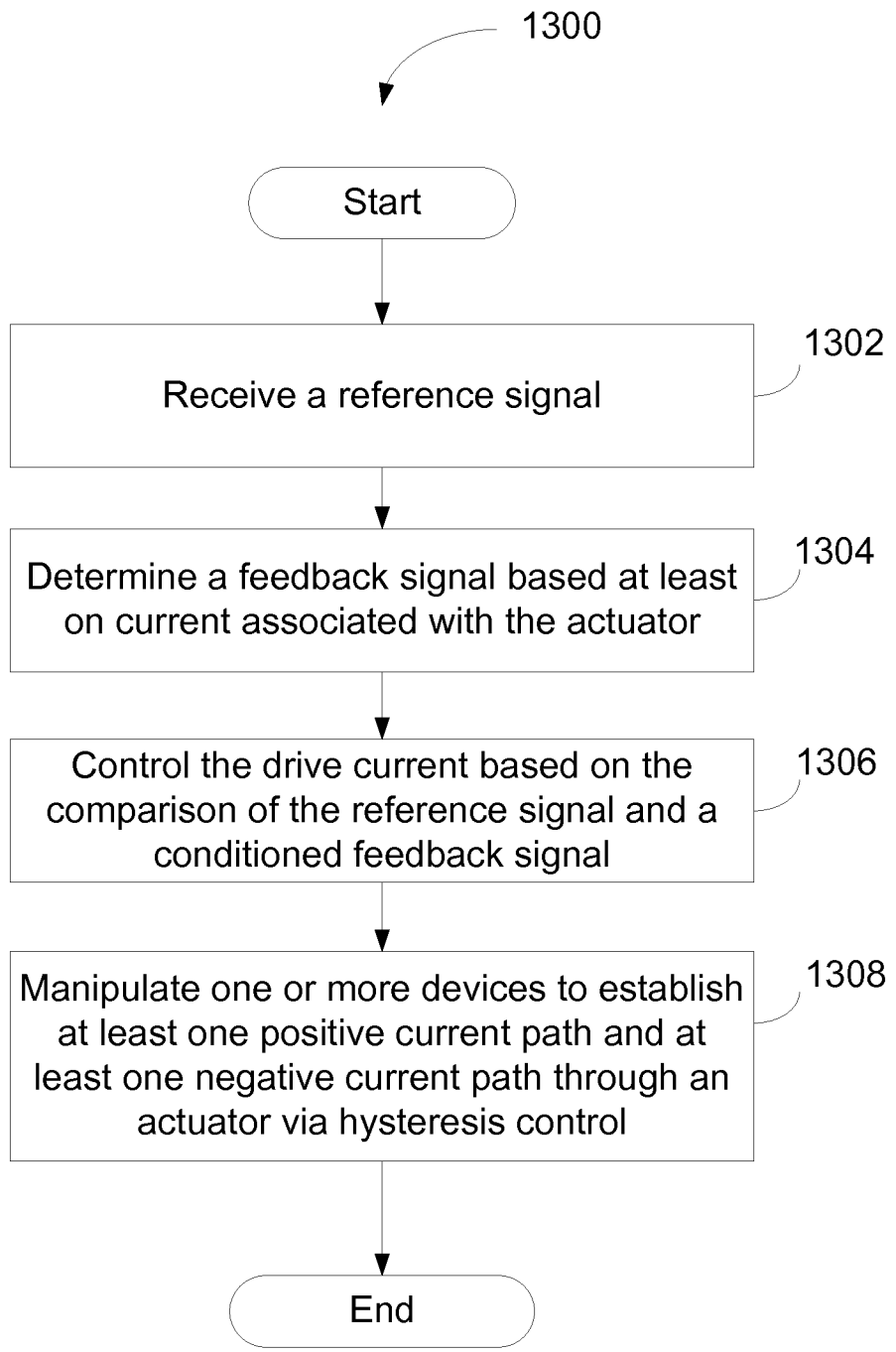
FIG. 13 is a flow diagram of another example method, according to an example embodiment of the invention.

An example method 1300 for controlling bi-directional drive current through an actuator will now be described with reference to the flow diagram of FIG. 13. The method starts in block 1302 where according to an example embodiment of the invention, the method may include receiving a reference signal. In block 1304, the method may include determining a feedback signal based at least on the current associated with the actuator. In block 1306, the method may include controlling the drive current based on the comparison of the reference signal and a conditioned feedback signal. In block 1308, the method may include manipulating one or more devices to establish at least one positive current path and at least one negative current path through an actuator via hysteresis control. The method 1300 ends after block 1308.

Figure 14:
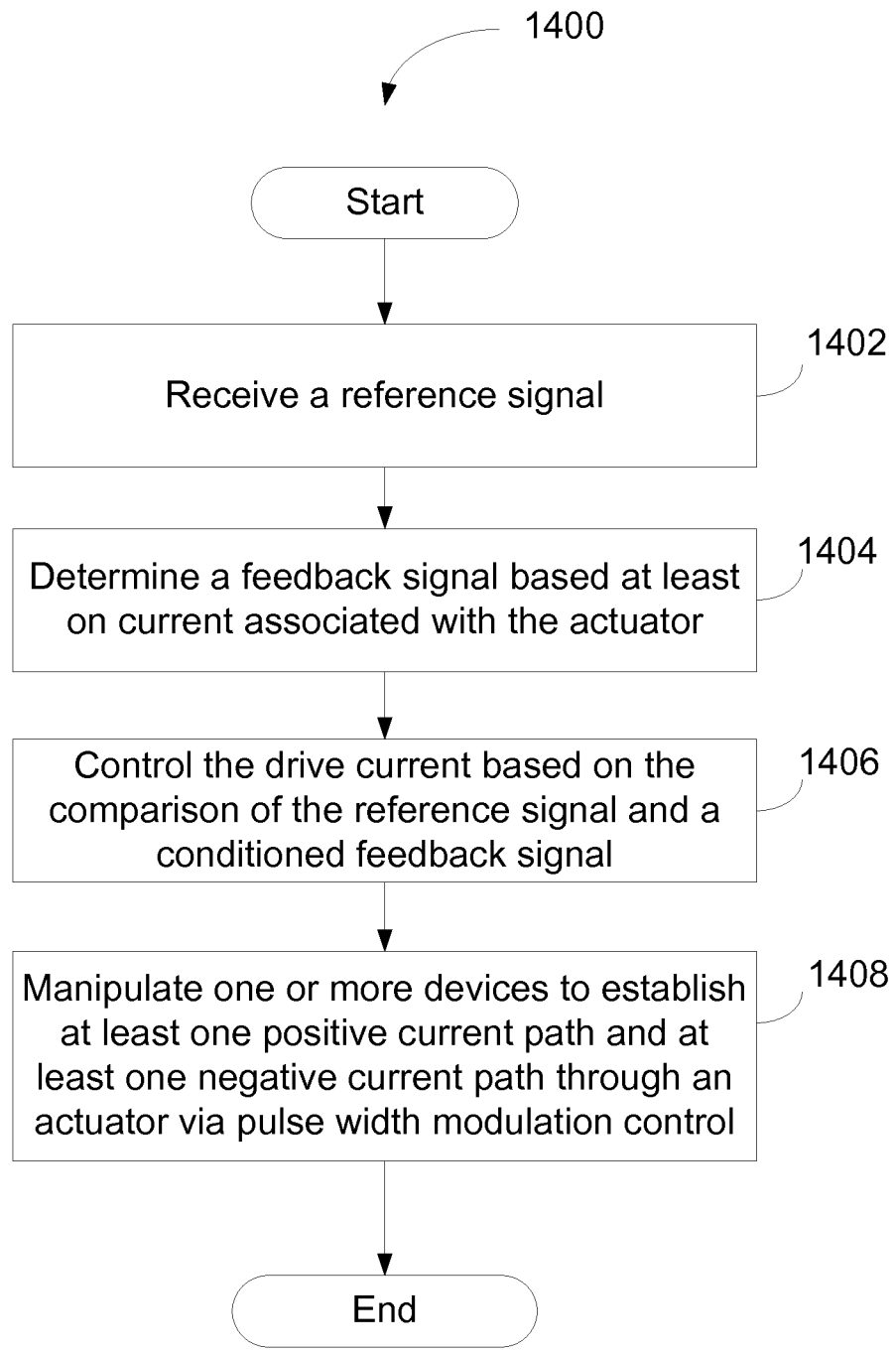
FIG. 14 is a flow diagram of another example method, according to an example embodiment of the invention.

An example method 1400 for controlling bi-directional drive current through an actuator will now be described with reference to the flow diagram of FIG. 14. The method starts in block 1402 where according to an example embodiment of the invention, the method may include receiving a reference signal. In block 1404, the method may include determining a feedback signal based at least on the current associated with the actuator. In block 1406, the method may include controlling the drive current based on the comparison of the reference signal and a conditioned feedback signal. In block 1408, the method may include manipulating one or more devices to establish at least one positive current path and at least one negative current path through an actuator via pulse width modulation control. The method 1400 ends after block 1408.

Accordingly, example embodiments of the invention can provide the technical effects of creating certain systems, methods, and apparatus that provide a servo actuator control with increased efficiency. Example embodiments of the invention can provide the further technical effects of providing systems, methods, and apparatus for reducing the amount of heat generated by servo actuator drivers or excitation signal drivers. Example embodiments of the invention can provide the further technical effects of providing systems, methods, and apparatus for eliminating heat sinks, or reducing the size of heat sinks that are required in conventional servo actuator drivers. Example embodiments of the invention can provide the further technical effects of providing systems, methods, and apparatus for reducing the size or footprint of circuitry, circuit boards, and/or panels associated with servo actuators and their driving electronics.

In example embodiments of the invention, the controller system 100, the actuator drive and position sensor excitation circuitry 200, and/or the positioning servo control system 300 may include any number of software applications that are executed to facilitate any of the operations.

In example embodiments, one or more I/O interfaces may facilitate communication between the controller system 100, the actuator drive and position sensor excitation circuitry 200, and/or the positioning servo control system 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the controller system 100, the actuator drive and position sensor excitation circuitry 200, and/or the positioning servo control system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the controller system 100, the actuator drive and position sensor excitation circuitry 200, and/or the positioning servo control system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the controller system 100, the actuator drive and position sensor excitation circuitry 200, and/or the positioning servo control system 300 with more or less of the components illustrated in FIGS. 1, 2 and 3.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for controlling actuator drive current comprising:
   receiving, by a power amplifier, a reference signal, wherein the reference signal includes a pulse width modulation (PWM) signal;
   generating, by the power amplifier, a drive signal based at least in part on the reference signal;
   driving an actuator drive based at least in part on the drive signal;
   obtaining, by a first feedback circuit, a first feedback signal based at least in part on a drive current;
   generating, by the first feedback circuit, a first conditioned feedback signal based at least in part on the first feedback signal;
   obtaining, by a second feedback circuit, a second feedback signal based at least in part on a position of the actuator drive, wherein the second feedback signal differs from the first feedback signal;
   generating, by the second feedback circuit, a second conditioned feedback signal based at least in part on the first feedback signal; and
   controlling, by a controller, the PWM signal based on the first conditioned feedback signal and the second conditioned feedback signal.

2. The method of claim 1, wherein determining the feedback signal comprises sensing drive current through the actuator by measuring a voltage drop.

3. The method of claim 1, wherein generating the first conditioned feedback signal comprises adding parallel capacitance to the actuator.

4. The method of claim 1, wherein determining a conditioned feedback signal comprises amplifying the feedback signal.

5. The method of claim 1, wherein determining a conditioned feedback signal comprises delaying the feedback signal and filtering the feedback signal, wherein determining a conditioned feedback signal is further based at least in part on the filtered feedback signal.

6. The method of claim 1, wherein generating the first conditioned feedback signal comprises modifying the time constant of the feedback signal.

7. The method of claim 6, wherein modifying the time constant is based at least in part on one or more of the following: resistance and capacitance.

8. A system for controlling drive current comprising:
   a controller;
   an actuator;
   a power amplifier operatively connected to the actuator and the controller, the power amplifier configured to receive a reference signal from the controller, generate a drive signal based at least in part on the reference signal, and supply the drive signal to the actuator, wherein the reference signal includes a PWM signal;
   a first feedback circuit operatively connected to the actuator and the controller, the first feedback circuit configured to obtain a first feedback signal based at least in part on a drive current and generate a first conditioned feedback signal based at least in part on the first feedback signal;
   a second feedback circuit operatively connected to the actuator and the controller, the second feedback circuit configured to obtain a second feedback signal based at least in part on a position of the actuator drive and generate a second conditioned feedback signal based at least in part on the first feedback signal; and
   wherein the controller is configured to
   manipulate the PWM signal based on the first conditioned feedback signal and the second conditioned feedback signal.

9. The system of claim 8, wherein the conditioned feedback signal is determined based at least in part on determining drive current through the actuator.

10. The system of claim 9, wherein the drive current is determined by measuring a voltage drop across a series sense resistor.

11. The system of claim 8, wherein the first feedback signal is based at least in part on a drive current passing through the actuator and through a capacitor in parallel with the actuator.

12. The system of claim 8, wherein the conditioned feedback signal comprises an amplified feedback signal.

13. The system of claim 8, wherein the conditioned feedback signal comprises a delayed filtered feedback signal.

14. The system of claim 8, wherein the first conditioned feedback signal comprises a delayed feedback signal based at least in part on modifying a time constant of the first feedback signal.

15. The system of claim 14, wherein modifying the time constant comprises modifying series resistance.

16. The system of claim 14, wherein modifying the time constant comprises modifying parallel capacitance.

17. An apparatus for controlling actuator drive current comprising:
   a power amplifier operatively connected to an actuator and a controller, the power amplifier configured to receive a reference signal from the controller, generate a drive signal based at least in part on the reference signal, and supply the drive signal to the actuator, wherein the reference signal includes a PWM signal;
   a first feedback circuit operatively connected to the actuator and the controller, the first feedback circuit configured to obtain a first feedback signal based at least in part on a drive current and generate a first conditioned feedback signal based at least in part on the first feedback signal;

a second feedback circuit operatively connected to the actuator and the controller, the second feedback circuit configured to obtain a second feedback signal based at least in part on a position of the actuator drive and generate a second conditioned feedback signal based at least in part on the first feedback signal; and wherein the controller is configured to manipulate the PWM signal based on the first conditioned feedback signal and the second conditioned feedback signal.

18. The apparatus of claim 17, wherein the first feedback signal is based at least in part on a drive current through the actuator.

19. The apparatus of claim 17, wherein the first feedback signal is based at least in part on a drive current passing through the actuator and through a capacitor in parallel with the actuator, and wherein the first feedback signal is delayed based at least in part on modifying the time constant of the first feedback signal.

20. The apparatus of claim 19 wherein the time constant of the first feedback signal is modified by modifying one or more of series resistance or parallel capacitance.

* * * * *